(12) United States Patent
Vallee et al.

(10) Patent No.: US 8,515,224 B2
(45) Date of Patent: Aug. 20, 2013

(54) METHOD FOR WRITING HIGH POWER RESISTANT BRAGG GRATINGS USING SHORT WAVELENGTH ULTRAFAST PULSES

(75) Inventors: Real Vallee, Quebec (CA); Martin Bernier, Quebec (CA)

(73) Assignee: Universite Laval, Quebec (CA)

( * ) Notice: Subject to any disclaimer, the term of this patent is extended or adjusted under 35 U.S.C. 154(b) by 31 days.

(21) Appl. No.: 13/387,871

(22) PCT Filed: Jul. 29, 2010

(86) PCT No.: PCT/CA2010/001190
§ 371 (c)(1),
(2), (4) Date: Jan. 30, 2012

(87) PCT Pub. No.: WO2011/011890
PCT Pub. Date: Feb. 3, 2011

(65) Prior Publication Data
US 2012/0128301 A1    May 24, 2012

Related U.S. Application Data

(60) Provisional application No. 61/229,346, filed on Jul. 29, 2009.

(51) Int. Cl.
*G02B 6/34* (2006.01)
(52) U.S. Cl.
USPC .............................................. 385/37
(58) Field of Classification Search
None
See application file for complete search history.

(56) References Cited

U.S. PATENT DOCUMENTS

| | | | |
|---|---|---|---|
| 5,867,618 A | 2/1999 | Ito et al. | |
| 5,881,186 A * | 3/1999 | Starodubov | 385/37 |
| 6,226,433 B1 * | 5/2001 | Weber | 385/129 |
| 6,573,026 B1 * | 6/2003 | Aitken et al. | 430/290 |

(Continued)

FOREIGN PATENT DOCUMENTS

| | | |
|---|---|---|
| CN | 201196492 | 2/2009 |
| CN | 101438189 | 5/2009 |
| WO | 2005111677 A2 | 11/2005 |
| WO | 2008037089 A1 | 4/2008 |

OTHER PUBLICATIONS

M. Bernier et al. Ytterbium fiber laser based on first-order fiber Bragg gratings written with 400nm femtosecond pulses and a phase-mask. Optics Express, 17:21:18887-18893, Oct. 2009.*

(Continued)

*Primary Examiner* — Mike Stahl
(74) *Attorney, Agent, or Firm* — Baker & Hostetler LLP (57) ABSTRACT

A method for writing a Bragg grating in a rare-earth doped glass optical waveguide is provided. Ultrafast optical pulses are generated, preferably in the femtosecond range and having a writing wavelength in the range of 300 nm to 700 nm and an intensity sufficient to induce a change of refractive index in the rare-earth doped glass waveguide through densification. The optical pulses are diffracted using a phase mask, to generate an interference pattern having a pitch providing a fundamental Bragg resonance corresponding to the target wavelength to be reflected by the grating. The interference pattern is impinged on a region of the rare-earth doped glass waveguide, which is heated to a temperature above a threshold of about 350° C., for a predetermined heating period. Advantageously, the heating step allows the elimination of photodarkening effects which would otherwise be present in the waveguiding properties of the waveguide.

12 Claims, 3 Drawing Sheets

(56) References Cited

U.S. PATENT DOCUMENTS

| | | | |
|---|---|---|---|
| 6,796,148 B1 * | 9/2004 | Borrelli et al. | 65/386 |
| 6,993,221 B2 | 1/2006 | Mihailov et al. | |
| 7,031,571 B2 | 4/2006 | Mihailov et al. | |
| 2007/0280596 A1 | 12/2007 | Hou et al. | |
| 2009/0274420 A1 * | 11/2009 | Vallee et al. | 385/37 |

OTHER PUBLICATIONS

Nikogosyan, "Multi-photon High-Excitation-Energy Approach to Fibre Grating Inscription", Measurement Science and Technology, vol. 18, No. 1, Jan. 2007.

Mihailov et al., "Induced Bragg Gratings in Optical Fibers and Waveguides Using an Ultrafast Infrared Laser and a Phase Mask", Laser Chemistry (2008).

Kryukov et al., "Long-Period Fibre Grating Fabrication with Femtosecond Pulse Radiation at Different Wavelengths", Microelectronic Engineering, vol. 69, No. 2-4, Sep. 2003.

Aslund et al., "Photodarkening Study of Gratings Written into Rare-Earth Doped Optical Fibres Using a Femtosecond Laser", *Proc. of SPIE*, vol. 6800 (2008).

Slattery, et al.; Fiber Bragg grating inscription by high-intensity femtosecond UV laser light: comparison with other existing methods of fabrication; Journal Optical Society of America; Feb. 2005; 354-361; vol. 22, No. 2.

Bernier, et al.; Bragg gratings photoinduced in ZBLAN fibers by femtosecond pulses at 800 nm; Optics Letters; Mar. 1, 2007; 454-456; vol. 32, No. 5.

Wikszak, et al.; Erbium fiber laser based on intracore femtosecond-written fiber Bragg grating; Optics Letters; Aug. 15, 2006; 2390-2392; vol. 31, No. 16.

Wikszak, et al.; Linearly polarized ytterbium fiber laser based on intracore femtosecond-written fiber Bragg gratings; Optics Letters; Sep. 15, 2007; 2756-2758; vol. 32, No. 18.

Martinez, et al.; Direct writing of fibre Bragg gratings by femtosecond laser; Electronics Letters; Sep. 16, 2004; 2 pages; vol. 40 No. 19.

Jovanovic, et al.; Stable high-power continuous-wave Yb3+-doped silica fiber laser utilizing a point-by-point inscribed fiber Bragg grating; Optics Letters; Jun. 1, 2007; 1486-1488; vol. 32, No. 11.

Jovanovic, et al., Narrow linewidth, 100W cw Yb3+-doped silica fiber laser with a point-by-point Bragg grating inscribed directly into the active core; Optics Letters; Oct. 1, 2007; 2804-2806; vol. 32, No. 19.

Jovanovic, et al.; Polarization-dependent effects in point-by-point fiber Bragg gratings enable simple, linearly polarized fiber lasers; Optics Express 6083; Apr. 13, 2009; 14 pages; vol. 17, No. 8.

Starodubov, et al.; Efficient Bragg grating fabrication in a fibre through its polymer jacket using near-UV light; Electronics Letters; Jul. 17, 1997; 1331-1333; vol. 33 No. 15.

Jasapara, et al.; Effect of heat and H2 gas on the photo-darkening of Yb+3 fibers; Optical Society of America; 2006; 2 pages.

Smelser, et al.; Characterization of Fourier components in type I infrared ultrafast laser induced fiber Bragg gratings; Optics Letters; Jun. 1, 2007; 1453-1455; vol. 32, No. 11.

Söderlund, et al.; Thermal bleaching of photodarkening-induced loss in ytterbium-doped fibers; Optics Letters; Sep. 1, 2009; 2637-2639; vol. 34, No. 17.

Ponsoda, et al.; Combined photodarkening and thermal bleaching measurement of an ytterbium-doped fiber; Proc. of SPIE; 2009; 7 pages; vol. 7195.

Androz et al.; Monolithic fluoride-fiber laser at 1480 nm using fiber Bragg gratings; Optics Letters; vol. 32, No. 10; pp. 1302-1304; May 15, 2007.

Bernier et al.; "Ultrabroadband fiber Bragg gratings written with a highly chirped phase mask and Infrared femtosecond pulses"; Optics Express; vol. 17, No. 5; pp. 3285-3290; Mar. 2, 2009.

Zhu, Qing, et al., Laser Fabrication by Moving Phase Mask; The 23rd Research Institute, CETC, Shanghai 200437 China.

\* cited by examiner

METHOD FOR WRITING HIGH POWER RESISTANT BRAGG GRATINGS USING SHORT WAVELENGTH ULTRAFAST PULSES

CROSS-REFERENCE TO RELATED APPLICATIONS

This application is a National Stage of International Patent Application No. PCT/CA2010/001190, filed on Jul. 29, 2010, which claims priority to U.S. Provisional Patent Application No. 61/229,346, filed on Jul. 29, 2009, the disclosures of which are incorporated herein by reference in their entirety.

FIELD OF THE INVENTION

The present invention relates to the field of Bragg gratings manufacturing and more particularly concerns a method for writing Bragg gratings in rare-earth doped glass waveguides for high power applications, using short wavelength ultrafast pulses.

BACKGROUND

High power applications, such as high power fiber lasers, require strong Bragg gratings which are resistant to the high intensity of light circulating in the optical fiber. Gratings obtained using the defect-resonant UV-induced physical process that is commonly used for the writing of fiber Bragg gratings (FBGs) in silica fibers are restricted to photosensitive fibers and can not generally be inscribed in the rare-earth is doped fibers used as laser gain media. This in turn implies that fiber laser cavities will require fusion splices between the active fiber and the photosensitive ones. Those splices may lead to additional intracavity losses and are not suited for some active fiber geometries, particularly when high power operation is required. Therefore, new approaches to the manufacture of FBGs need to be developed in order to inscribe grating directly into the active fiber.

The refractive index change resulting from the nonlinear interaction of focused femtosecond pulses with glass seems a very promising alternative to the defect-resonant UV-induced physical process mentioned above. As shown in M. Bernier, D. Faucher, R. Vallée, A. Saliminia, G. Androz, Y. Sheng, and S. L. Chin, "Bragg gratings photoinduced in ZBLAN fibers by femtosecond pulses at 800 nm," Opt. Lett. 32, 454-456 (2007), infrared femtosecond (fs) pulses with a first-order phase-mask can be used to write efficient FBGs in both doped and undoped fluoride fibers for operation at 1.5 µm. Alternatively, FBGs written with the scanning phase-mask technique using IR fs pulses also proved crucial to the development of silica fiber lasers doped with either erbium (see E. Wikszak, J. Thomas, J. Burghoff, B. Ortaç, J. Limped, S. Nolte, U. Fuchs, and A. Tünnermann, "Erbium fiber laser based on intracore femtosecond-written fiber Bragg grating," Opt. Lett. 31, 2390-2392 (2006)) as well as with ytterbium (see E. Wikszak, J. Thomas, S. Klingebiel, B. Ortaç, J. Limped, S. Nolte, U. Fuchs, and A. Tünnermann, "Linearly polarized ytterbium fiber laser based on intracore femtosecond-written fiber Bragg gratings," Opt. Lett. 32, 2756-2758 (2007)) active ions. In the latter case, a maximum output power of 100 mW at 1040 nm was obtained from an ytterbium-doped panda-type fiber with a laser slope efficiency of 27%. The second-order FBGs involved in this experiment had a peak reflectivity of 65% and 45% for each polarization, respectively.

MIHAILOV et al. (U.S. Pat. Nos. 6,993,221 and 7,031,571) discuss the writing of Bragg gratings in optical fibers which are not photosensitive, using ultrashort pulses through is a phase mask. They argue that contrary to prior art assertions, gratings can be written using femtosecond pulses of intensity high enough to generate a refractive index change in the fiber, while still being below the damage threshold of the phase mask. The disclosed technique allegedly alleviates the need for photosensitising the fiber and for post processing of the grating through annealing or the like. MIHAILOV et al. further prone the selection of a phase mask having a pitch selected to induce a high order Bragg resonance at the wavelength of interest, in order to limit the angular dispersion of the long wavelength writing beam induced by a lower order phase mask. However, for high power applications, the strength of the high order grating at the wavelength of interest may not always be sufficient.

There remains a need for a method of writing Bragg gratings particularly suitable for high power fiber lasers or similar applications which alleviates at least some of the drawbacks of the prior ad.

SUMMARY OF THE INVENTION

In accordance with one aspect of the invention, there is provided a method for writing a Bragg grating in a rare-earth doped glass optical waveguide, the Bragg grating reflecting light at a target wavelength.

The method involves generating ultrafast optical pulses. The ultrafast optical pulses have a writing wavelength in the range of 300 nm to 700 nm and an intensity sufficient to induce a change of refractive index in the rare-earth doped glass waveguide through material densification.

The method further includes diffracting the optical pulses using a phase mask, to generate an interference pattern having a pitch providing a fundamental Bragg resonance corresponding to the target wavelength. The interference pattern is impinged on a region of the rare-earth doped glass waveguide to write the same is therein, thereby defining the Bragg grating.

The method further includes heating the region of the waveguide containing the Bragg grating to a temperature above a threshold of about 350° C., for a predetermined heating period sufficient to substantially eliminate photodarkening effects in the waveguide.

The ultrafast optical pulses preferably have a pulse duration in the femtosecond range. In one embodiment of the invention, the wavelength of the optical pulses is around 400 nm, as for example obtained through the second harmonic of a Ti-sapphire femtosecond laser.

Advantageously, the heating step above allows the elimination of photodarkening effects which would otherwise be present and therefore alter the waveguiding properties of the waveguide.

Other features and advantages of the present invention will be better understood upon a reading of preferred embodiments thereof with reference to the appended drawings.

DESCRIPTION OF PREFERRED EMBODIMENTS OF THE INVENTION

The present invention generally relates to a method for writing Bragg gratings in an optical waveguide. The expression "optical waveguide" it is understood to refer to any structure in which light may travel and be guided. The waveguide is preferably embodied by an optical fiber, but any appropriate light-guiding structures could be used such as planar or channel waveguides. The optical waveguide is made of glass such as silica and is doped with at least one rare-earth element. In the preferred embodiment, the waveguide is ytterbium-doped, but other dopants could be considered such as erbium, holmium, thulium, praseodymium, neodymium, dysprosium, etc or combinations thereof. It is also an advantageous feature of the invention that the waveguide need not be made of a photosensitive material or be photosensitized prior to the writing of a Bragg grating therein. As such, co-doping the waveguide with germanium, as is known in the art to enhance photosensitivity, is not required. The waveguide may however include other co-dopants such as aluminum, phosphorus, etc. As one skilled in the art will readily understand, rare-earth doped glass waveguides are especially useful for high power applications such as high power fiber lasers. Advantageously, since the method according to embodiments of the present invention can be used to write Bragg gratings in the same type of fiber as those used as gain media for fiber lasers, the entire laser cavity could be embodied in a single length of fiber, avoiding the need for fiber connectors and the associated losses. This ability is particularly interesting when used for laser emission at high average and/or peak power, for which the fiber preparation/connectorization steps are generally problematic, for example in ultrashort pulse fiber laser devices, where the very high intensities generated in the laser cavity may lead to catastrophic fiber damage. Another field of application of such splice-free fiber laser cavity is pertaining to distributed feedback (DFB) lasers where the requirement for low intravity losses and strong grating may benefit from direct FBG inscription in the active fiber.

Throughout the present description, the expression "Bragg grating" is understood to refer to any periodic or aperiodic refractive index pattern permanently provided in the waveguide. It will be understood by one skilled in the art that the Bragg grating may be single or multi-channel, and may be chirped, slanted, sampled, or involve more than one such characteristics. The Bragg grating reflects light at a target wavelength, that is, the wavelength or wavelengths which the Bragg grating will be used to filter in its predestined application. For example, in the context of fiber lasers, Bragg gratings manufactured using a method embodying the present invention can be used as the reflectors of the laser cavity, and the target wavelength would then correspond to the wavelength of the laser beam building in the laser cavity. One skilled in the art will readily understand that the expression "target wavelength", even used in the singular, could refer to a more complex spectral profile reflected by the Bragg grating.

The method according to embodiments of the invention is based on the use of ultrafast laser pulses of short wavelength and an appropriate phase mask which diffract the optical pulses to generate an interference pattern, with a pitch providing a fundamental Bragg resonance at the target wavelength.

The method first involves generating the ultrafast optical pulses. By "ultrafast", it is understood that the optical pulses have a duration in the femtosecond range, preferably less than 2 picoseconds, and more preferably between 10 and 1000 fs. The repetition rate of these optical pulses may be set between 10 Hz and 10 000 Hz. As one skilled in the art will readily understand, at low repetition rate the writing process requires a longer exposure time to reach a target reflectivity, which may lead to mechanical instabilities and therefore limit the grating growth. The use of a high repetition rate (i.e. 10 kHz) enables a shorter exposure time to reach the same target reflectivity but may also lead to a local detrimental heating effect that would limit the grating growth. The repetition rate of the optical pulses is therefore preferably set to an appropriate value within the range above in order to avoid the detrimental effects of both extremes. The writing wavelength of the optical pulses, that is, their wavelength when they reach the waveguide, is in the range of 300 nm to 700 nm. It will be understood by one skilled in the art that wavelengths in this range are considered "short" with comparison to the usual wavelength of ultrafast pulses used for writing Bragg gratings in glass, which is usually around 800 nm.

Ultrashort pulses at short wavelengths are strongly temporally dispersed by their transmission through silica based optical elements such as lenses and phase masks. The use of wavelengths below about 300 nm then requires the use of reflective optical elements to produce the interference pattern with an intensity sufficient to induce the desired refractive index modification of the waveguide, which makes the beam is alignment much more complicated than when typical transmissive elements are used. It is therefore an advantageous aspect of the present invention that a writing wavelength above 300 nm is selected, for which the use of transmissive optical elements allows to maintain the pulse duration in the femtosecond regime and inscribed a glass densification refractive index change. As one skilled in the art will note, typical optical coating polymers are strongly absorbed at wavelength below 300 nm, but substantially transparent at wavelengths within the range specified above, Embodiments of the present invention therefore allow the writing of the Bragg gratings through the polymer jacket.

Various types of structural changes may lead to permanent refractive index change in a dielectric material. The first type is related to color centers or defects and may be induced either by UV resonant or by ultrashort non-resonant radiation. This type of change generally requires the use of photosensitive of photosensitized glass and is relatively unstable. It is erased in fused silica at temperature above 350° C. The second type of change is associated with optical damages within the material (e.g. cracks and voids) and is therefore much more thermally stable although it is accompanied by appreciable transmission losses. In fused silica, this type of photoinduced refractive index change, which can be produced by tightly focusing an ultrashort pulse, is stable beyond 1000° C. but is associated with significant propagation losses. The third type of photo-induced change is related to glass densification. It is generally produced with ultrashort pulses under focusing conditions leading to smaller intensities than those leading to optical damage. This type of change is persistent in fused silica up to 900° C. and is associated with very low losses. The present invention involves the use of the later type of refractive index change, i.e. glass densification. Since ultrashort pulses can lead to the three previous types of change, special care must be paid with respect to inscription conditions, in order to favour this type of change.

The ultrafast optical pulses may be generated by any appropriate laser source or group of components. For example, as will be explained further below, the ultrafast optical pulses may be generated by a Ti-Sapphire laser emitting around 800 nm and frequency converted by a second harmonic generator to 400 nm, thereby falling within the wavelength range defined above. Alternatively, an ultrashort fiber laser cavity emitting high energy ultrashort pulses at about 1030 nm can also be frequency converted by a second or third harmonic generator to respectively about 515 nm and 345 nm and therefore be use to write the gratings.

The method next includes diffracting the optical pulses using a phase mask to generate an interference pattern having a pitch providing a fundamental Bragg resonance corresponding to the target wavelength. The phase mask is preferably made of silica and may be fabricated according to any appropriate technique as well known in the art. The pitch of the phase mask is selected according to the target wavelength, taking into account the considerations below.

To obtain a Bragg grating resonance in a waveguide of effective refractive index $n_{eff}$ at a design wavelength $\lambda_B$, the periodic modulation of pitch $\Lambda$ of the effective refractive index in the waveguide must respect the phase-matching condition given by:

$$\frac{2 \cdot n \cdot \pi}{\Lambda} = 2 \cdot \frac{2\pi \cdot n_{eff}}{\lambda_B} \quad (1)$$

By simplification, we obtain:

$$\lambda_B = 2 \cdot n_{eff} \cdot \frac{\Lambda}{n} \quad (2)$$

Where n=1, 2, 3, ...

The design wavelength $\lambda_B$ corresponds to the fundamental Bragg resonance for n=1. By matching the fundamental Bragg resonance of the grating to the target wavelength, an optimal diffraction efficiency is obtained, that is, the grating coupling coefficient, (and therefore its reflectivity) is maximal for a given refractive index modulation.

The use of the fundamental Bragg resonance is of particular importance for high-power fiber laser applications. For higher-order Bragg gratings (i.e. n>1), the induced periodic refractive index structure has to be anharmonic to obtain a significant coupling coefficient for a given refractive index modulation, that is, the refractive index modulation cannot be purely sinusoidal, which is generally the case when nonlinear interactions lead the refractive index change such as using ultrashort infrared pulses to write FBGs in pure silica fiber as taught by Smelser et al, Optics Letters 32,p. 1453, 2007. Representation of the periodic refractive index structure using Fourier series provides the coupling coefficient for the higher-order Bragg resonances. Since the material response influences the induced refractive index structure and its localization, the coupling coefficient for a higher order Bragg grating may be poor for a given material composition and the target coupling coefficient would not be reached since the maximum refractive index modulation is limited or can be reached after a significantly longer exposure time along which additional losses is associated, which is not desirable, particularly for high power laser applications.

For example, let us consider a case where a target wavelength of 1070 nm is desired, which corresponds to a typical emission wavelength value for ytterbium-doped high power fiber lasers. In order for the fundamental Bragg resonance in a silica fiber with a typical effective refractive index of 1.452 (at 1070 nm) to match this wavelength, the pitch of the Bragg grating must be:

$$\Lambda_{n=1} = \frac{n \cdot \lambda_B}{2 \cdot n_{eff}} = \frac{1 \cdot 1070 \text{ nm}}{2 \cdot 1.452} = 368 \text{ nm} \quad (3)$$

A standard phase-mask is usually designed to maximize the diffracted energy in the ±1 orders of interference. The interference from these ±1 orders diffracts light according to an interference pattern having a pitch corresponding to half the pitch of the phase mask itself, The pitch of the phase mask is therefore independent of the wavelength of the writing light, i.e. the ultrafast optical pulses. From equation (2), it follows that the relationship between the wavelength of the fundamental Bragg resonance and the pitch of the phase mask $\Lambda_{PM}$ is given by:

$$\lambda_B = n_{eff} \cdot \Lambda_{PM} \quad (4)$$

Continuing the example above, to obtain a fundamental Bragg resonance at 1070 nm in a silica fiber, the pitch of the phase mask must be:

$$\Lambda_{PM} = \frac{\lambda_B}{n_{eff}} = \frac{1070 \text{ nm}}{1.452} = 737 \text{ nm} \quad (5)$$

Despite the fact that the pitch of the phase mask is independent of the wavelength of the optical pulses, the diffraction of the incident light by the phase-mask in the ±1 order should respect physical criteria in order to be efficient. In theory, the phase mask diffracts light having a given wavelength $\lambda_l$ in the ±1 orders following the grating equation given by:

$$\sin\theta \pm 1 = \frac{\pm 1 \cdot \lambda_l}{\Lambda_{PM}} \quad (6)$$

Where $\theta$ is the diffraction angle with respect to an axis normal to the mask interface. It follows from eq. (6) that diffraction in the ±1 orders will be allowed if and only if the term $\sin\theta \pm 1$ is smaller or equal to 1, and that implies that the pitch of the phase mask be equal to or larger than the diffracted (i.e. writing) wavelength $\lambda_l$. That mere fact totally disqualifies the Ti:sapphire laser at 800 nm for the writing of a Bragg grating reflective at 1070 nm which, as discussed above, relies on the use of a phase mask period of 737 nm. Moreover, if the pitch of the phase mask is too close to the diffracted wavelength $\lambda_l$, a significant portion of the incoming light will be diffracted in the zero order, reducing the diffraction efficiency in the ±1 orders. Preferably, in order to obtain a diffraction efficiency in the ±1 orders sufficient to efficiently write a Bragg grating, the phase-mask pitch should be at least 1.2 times the wavelength of the optical pulses, this value being calculated to maintain at least 75% of the diffracted energy in the ±1 orders by the rigorous coupled wave analysis technique. Applying this condition to the example above, the wavelength range of the ultrafast optical pulses used to write a grating of fundamental Bragg resonance at 1070 nm in a silica fiber is given by:

$$\lambda_l \leq \frac{\Lambda_{PM}}{1.2} = \frac{737}{1.2} = 615 \text{ nm} \quad (7)$$

One skilled in the art will readily understand that in this example, the desired fundamental Bragg resonance in a silica waveguide at 1070 nm cannot be obtained using the usual wavelength of about 800 nm from a Ti:Sapphire laser. However, light from such a laser can be frequency converted to obtain the second harmonic of the Ti:Sapphire laser beam at 400 nm, which respects the condition above and can therefore be used to write fundamental FBGs in silica fibers at a target wavelength of 1070 nm, and, more generally, to obtain strongly reflective FBGs for ytterbium fiber lasers operating in the 950-1150 nm band.

Once an appropriate diffraction pattern is obtained through diffraction of the ultrafast optical pulses by the phase mask, it is impinged on a region of the rare-earth doped glass waveguide. Preferably, in the case of an optical fiber as the waveguide, the laser pulses are focussed on a region around the fiber core, in order to partially or totally cover the propagating mode to be reflected. The resulting strong light intensity modifies the refractive index of the glass in a permanent fashion, therefore providing the desired Bragg grating.

As explained above, the fundamental Bragg resonance is determined by the pitch of the phase mask $\Lambda_{PM}$ and the effective refractive index in the core of the optical waveguide $n_{eff}$. Other factors may however have a slight impact on the final value of the target wavelength as reflected by the Bragg grating. Optionally, the method according to embodiments of the invention may make use of such factors in order to provide a step of fine tuning the target wavelength. Such a fine tuning may be performed by adjusting the distance between the phase mask and the optical waveguide when the incident writing beam is slightly diverging in its non-focusing axis. For example, it has been observed that the Bragg wavelength in the experiment above could be changed from 1065 nm to 1080 nm by simply changing the fiber to phase mask separation if the writing beam is set slightly diverging with an angle of about 0.02 radians. Such a simple control can be very advantageous as it is usually believed that changing the Bragg wavelength requires the manufacturing of a different phase mask, which can be a costly operation.

It has been noted by the inventors that the modification of the refractive index of the rare-earth doped waveguide in the manner described above induces strong losses in the waveguiding properties of this waveguide, most likely through photodarkening. In order to drastically reduce or eliminate these losses, the method according to the present invention includes a step of heating the region of the waveguide containing the Bragg grating to a temperature above a threshold of about 350° C. It has been found that performing such a heating step for an appropriate heating period, for example a few minutes, can substantially reduce, in some cases completely eliminate photodarkening losses while maintaining a large refractive index modulation defining the Bragg grating. The length of the heating period depends on the heating temperature selected above said threshold, as well as the desired reduction in photodarkening. One skilled in the art will readily understand that photodarkening effects will be considered substantially eliminated if they are reduced to a level which is low enough to permit the use of the fiber in its targeted application. For a given reduction in photodarkening, it has been found that the higher the temperature during the heating step, the shorter the required heating period. For example, heating the fiber to about 400° C. for 90 seconds has been found sufficient to eliminated photodarkening effects so that the grating may be used in high power laser applications. The required heating period for a given embodiment may be experimentally predetermined, or, in some embodiments, the transmission properties of the fiber at wavelengths where it is known to suffer from photodarkening can be monitored during annealing to detect the change in losses.

The region of the waveguide can be heated through any appropriate means. In one embodiment, the waveguide can be put in an oven whose temperature is ramped up to the desired value. In another embodiment, the waveguide is heated locally using a focused $CO_2$ laser, a heating filament or a small hydrogen flame, in order to limit the heating zone to the grating, while maintaining the pristine fiber polymer coating in the surrounding area of the grating. Such embodiments would be especially appropriate for an optical fiber whose polymer jacket has been removed prior to the heating or to the writing of the Bragg grating. For example, a $CO_2$ laser can be focused on the grating region of the waveguide with a sufficient intensity to induce a sufficient local heating of the waveguide to anneal the photoinduced losses. By a measurement of the broadband transmission of the fiber core, the effect of heating on photoinduced losses can be observed by a significant reduction of the losses in the 600-800 nm region as shown in the FIG. 6 of the following example. Alternatively, since the Bragg grating can be written through the polymer jacket which is at least partially transparent to the exposure light, the core of the fiber can be heated through the propagation of a light beam in the 300-800 nm wavelength range of sufficient intensity therein, which could advantageously be done without the need of removing the fiber polymer jacket.

Figure 1:
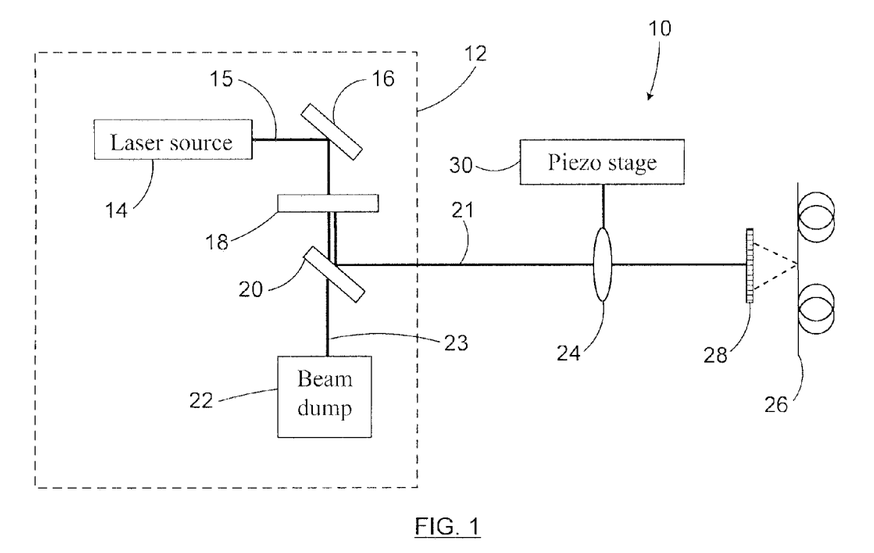
FIG. 1 is a schematized representation of a system for implementing a method for writing Bragg gratings according to an embodiment of the invention.

One skilled in the art will readily understand that Bragg gratings can be written according to embodiments of the invention using a variety of experimental set-ups or systems. Referring to FIG. 1, there is shown an example of a system 10 which may be used to perform the first steps of the method described above. The system 10 includes a light generating module 12, here embodied by a femtosecond laser source 14 and associated optical components. In one example, the femtosecond laser source 14 may be a Ti-sapphire laser emitting seed optical pulses 15 at about 800 nm and having peak energy at this wavelength of 3.6 mJ. In the illustrated embodiment, the seed optical pulses 15 from the laser source 14 are reflected by a mirror 16 having a high reflectivity around the emission wavelength of 800 nm, followed by a second harmonic generator 18 which converts part of the optical energy of the pulses at about 400 nm, the energy of the converted light being around 1.0 mJ. A dichroic mirror 20 or other wavelength selective component separates the 400 nm radiation, defining the optical pulses 21 which will be used in the grating writing step, from the remaining 800 nm radiation 23, the latter being stopped by a beam dump 22. The converted optical pulses 21 exiting the light generating module 12 are focused by a cylindrical lens 24 on the waveguide, here embodied by an optical fiber 26, through a phase mask 28. The cylindrical lens 24 is preferably mounted on piezoelectric stage 30 to scan the optical pulses 21.

EXAMPLE

In one example of an embodiment of the invention, a Bragg grating was written in an optical fiber using a system similar to the one illustrated at FIG. 1. The waveguide used in this experiment was a double cladding ytterbium doped silica fiber. The pump core of the double cladding fiber had a diameter of 128 μm with an octogonal shaped geometry while the signal core had a 6 μm diameter and was co-doped solely with 2 mol % of $Al_2O_3$, hence no photosensitive element such as germanium was added to the fiber glass composition.

A Ti-sapphire regenerative amplifier system (Coherent Legend-HE, trademark) that produces fs-laser pulses of 3.5 mJ per pulse at 1 kHz repetition rate with central wavelength at $\lambda=806$ nm was used as pump source. The duration of the Fourier-transform limited pulses was measured to be about 35 fs. A BBO crystal (Eksma Optics, BBO-1502,trademark) was used to produce a maximum of 1.0 mJ of second harmonic at 403 nm. A dichroic mirror was used to separate the 403 nm beam from the residual 806 nm pump. The 403 nm laser beam (resized to ~8.5 mm×15 mm at $1/e^2$) was then focused by a cylindrical lens and through a silica phase mask down to a focal line parallel to the fiber core. Based on Gaussian beam optics, the width of the focal line is estimated to $1.27 f\lambda/D \sim 7$ μm, where f=112 mm is the focal length and D is the beam size at the focusing lens. In order to ensure a uniform index modulation over the fiber core, the focusing lens was made to oscillate using a piezoelectric mount in the transverse direction, so that the focal line scanned over the fiber across a 20 μm area surrounding the fiber core with a frequency of 0.05 Hz. The fiber to phase-mask separation was set to 3 mm in order to prevent any damage to the later.

The phase mask used in the experiment had a uniform pitch of 738 nm over a length of 40 mm, providing a fundamental Bragg resonance at around 1070 nm. The phase mask was fabricated by holographic lithography process with an etching depth of 475 nm and a duty-cycle of 40% on a UV-grade fused silica substrate. According to diffraction theory, under writing conditions involving a wavelength of 400 nm and a phase-mask pitch of 738 nm, only three diffraction orders (0, ±1) are produced with 3.4% of the energy in the zero order and the remaining 96% in the ±1 orders, thus efficiently contributing to the interference pattern. Transmission and reflection spectra of the FBGs were measured using a super-continuum source (Koheras SuperK Power, trademark), an optical fiber coupler and an optical spectrum analyzer (ANDO AQ6317B, trademark). The thermal annealing was performed using a fiber optic oven (ASP500C, trademark) at up to 500° C.

Figure 2:
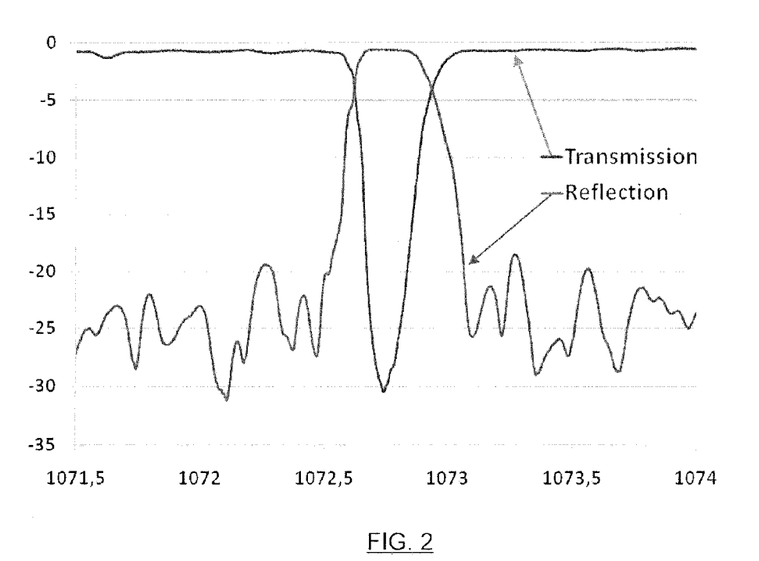
FIG. 2 is a graph of the measured transmission and reflection spectra of a FBG written in an ytterbium-doped fiber over 15 mm at 0.9 mJ, 1 kHz, during 20 s.

A length of 15 mm of the double-clad ytterbium doped fiber was first exposed to the focused fs pulse beam for 20 s. The reflection and transmission spectra of the resulting FBG are shown in FIG. 2.

A transmission dip of −30 dB (corresponding to a reflectivity of 99.9%) was obtained at 1072.7 nm with full-width half-maximum (FWHM) of 0.30 nm. The throughput (or gray) losses were measured to be 0.6 dB using a cut-back at 1075 nm. In order to estimate the FBG parameter values, a numerical simulation using IFO gratings 4.0™ was performed to fit the experimental spectral curves presented in FIG. 2. The corresponding grating parameters are as follows: grating length=6.9 mm, Gaussian apodization (taper size=0.5), refractive index modulation=$9.4\times10^{-4}$.

Figure 3:
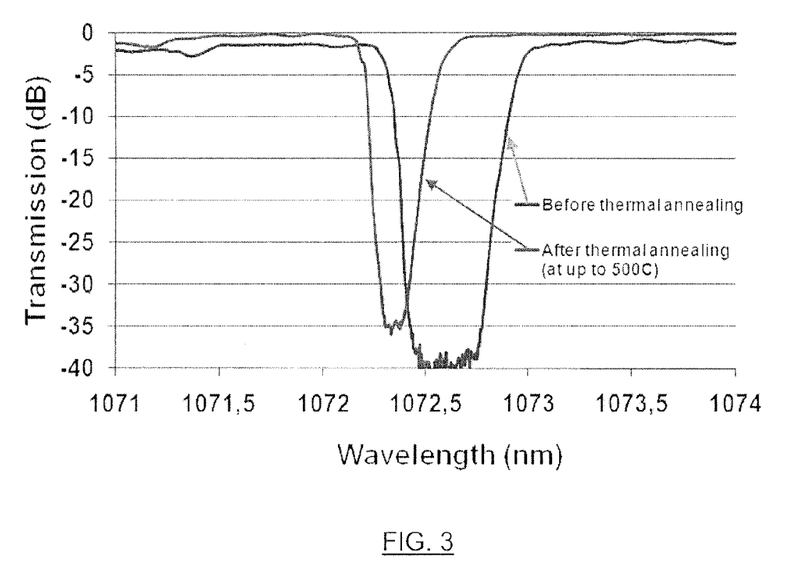
FIG. 3 is a graph of the measured transmission spectrum of a FBG written in an ytterbium-doped fiber over 15 mm at 0.9 mJ, 1 kHz, during 40 s before and after thermal annealing at up to 500° C.

In order to augment further the FBG reflectivity, another piece of the same fiber was exposed the focused fs pulse beam under the same experimental conditions but for twice exposure time, therefor 40 s. The transmission spectrum of the resulting FBG is shown in FIG. 3. In this case, a transmission dip <−40 dB was obtained with a full-width half-maximum (FWHM) of 0.65 nm. It is to be noted that the measurement was limited to −40dB due to the limited dynamic range of the characterization set-up. The throughput losses were measured to be 1.2 dB and the corresponding refractive index modulation was estimated as $2.1\times10^3$. This FBG was then thermally annealed in an oven where the temperature was increased stepwise by 50° C. for every 30 minutes ranging from 50° C. to 500° C. The resulting transmission spectrum is shown in FIG. 3 along with the transmission curve prior to thermal annealing. A 0.2 nm spectral shift of the transmission peak is observed along with a narrowing of the peak (FWHM of 0.41 nm), and a decrease of the peak reflectivity down to R~−35 dB.

Figure 4:
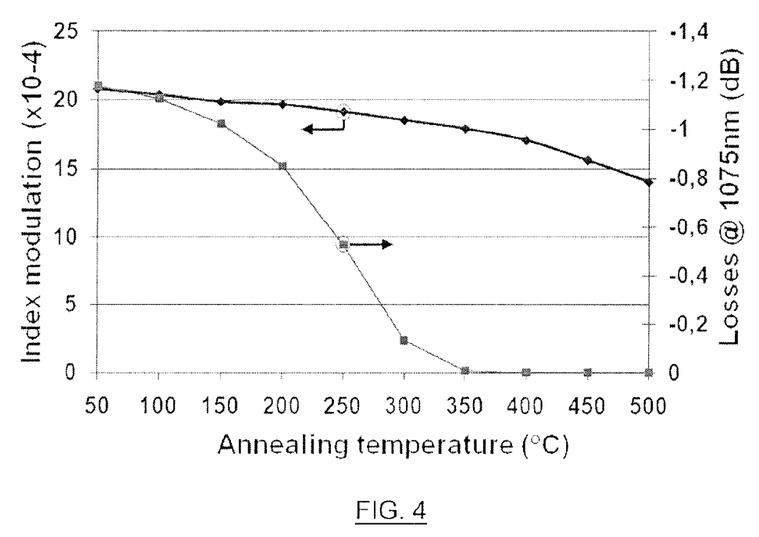
FIG. 4 is a graph showing the evolution of the refractive index modulation and throughput losses of the FBG introduced at FIG. 3 as a function of the annealing temperature. The corresponding refractive index modulation was evaluated under adiabatic conditions, i.e. after 30 minutes of annealing at the corresponding temperature.

An interesting feature resulting from the complete thermal annealing treatment is that the throughput losses could be reduced to less than 0.05 dB with a corresponding refractive index modulation of $1.45'10^{-3}$. In the thermal annealing process the refractive index change and the corresponding photo-induced fiber background losses in the FBG were carefully monitored as a function of the temperature. Accordingly, for every 30 minutes of annealing treatment at a constant temperature, the FBG transmission spectrum was measured from which the refractive index modulation could be inferred. The evolution of the refractive index modulation as a function of annealing temperature is shown in FIG. 4 along with the fiber throughput losses evaluated at 1075 nm. One first notes a slight and almost linear decrease of the refractive index modulation for temperatures up to 350° C. Meanwhile, the throughput losses at 1075 nm are shown to decrease essentially to zero as a result of thermal annealing. This is attributed to the factor that the color centers are usually destroyed in silica glass at 350° C. Consequently, the refractive index change initially resulting from both color center and glass densification would only rely on glass densification following the thermal annealing temperature beyond 350° C. Interestingly, this glass densification contribution to the photo-induced refractive index change seems to be related to negligible photo-induced losses at 1075 nm. From a practical viewpoint, a complete recovery of the fiber transmission pristine conditions, that is prior to exposure to the focused femtosecond beam, can be obtained by only a is few minutes of annealing at a temperature exceeding 350° C.

Figure 5:
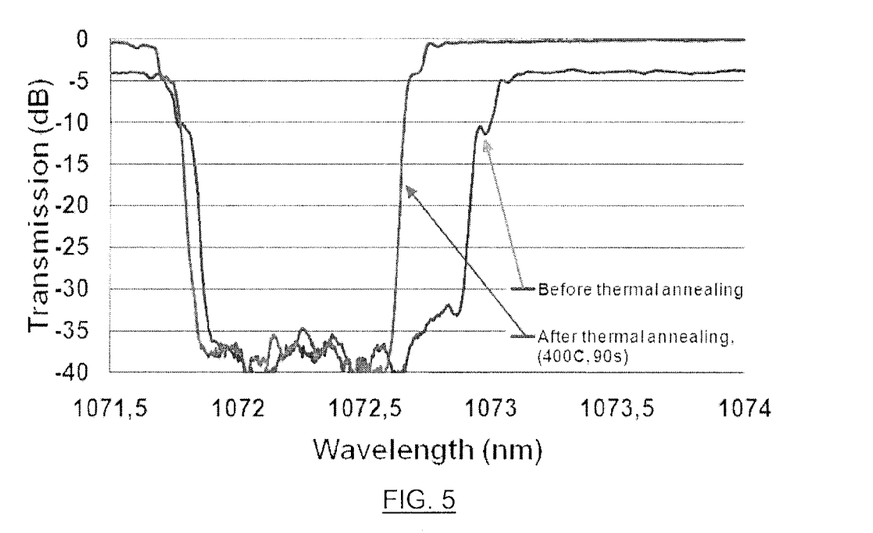
FIG. 5 is a graph of the measured transmission spectrum of a FBG written in an ytterbium-doped fiber over 15 mm at 0.9 mJ, 1 kHz, during 100 s before and after thermal annealing at 400° C. for 90 s.
Figure 6:
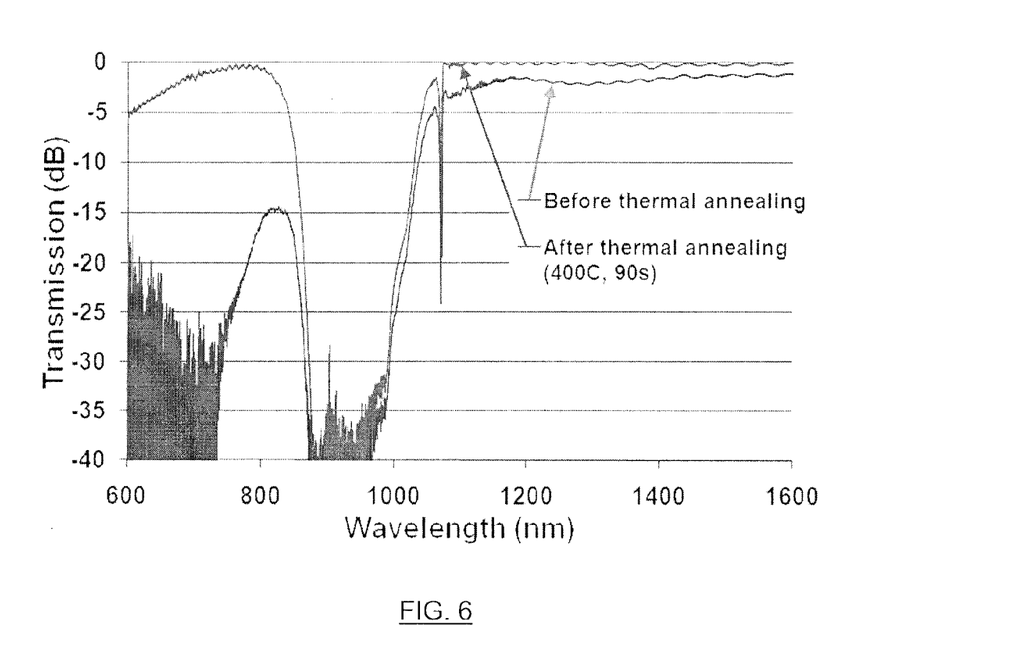
FIG. 6 is a graph of the measured broadband transmission spectrum of a FBG written in an ytterbium-doped fiber over 15 mm at 0.9 mJ, 1 kHz, during 100 s before and after thermal annealing at 400° C. for 90 s.

To further confirm the process, a stronger and therefore broader FBG was inscribed. FIG. 5 and FIG. 6 respectively show the narrowband and broadband transmission spectra of such a FBG written under the same experimental conditions except for an exposure time of 100 s before and after a thermal annealing at 400° C. for 90 s. The effects of the thermal annealing treatment on this FBG were measured in two spectral ranges: FIG. 5 shows a close-up of the FBG transmission, whereas FIG. 6 illustrates broadband fiber transmission and the corresponding loss recovery. In both cases the detection level is limited to about −40 dB by the noise in the characterization set-up. Following the annealing process, the throughput losses at 1075 nm (i.e. measured slightly off the Bragg wavelength not to interfere with the FBG transmission) are shown to pass from −4.0 dB to −0.13 dB whereas the corresponding photo-induced refractive index modulation is maintained to a large value (i.e. $3.6\times10^{-3}$). In the case of FIG. 6, the spectral resolution was set to 1 nm and the transmission normalization was obtained by using a cutback reference with an undoped fiber having as similar modal content as the ytterbium doped fiber. It is clear from this result that the photo-induced losses can be eliminated after only 90 s of annealing at 400° C.

Of course, numerous modifications could be made to the embodiments described above without departing from the scope of the invention as defined in the appended claims.

The invention claimed is:

1. A method for writing a Bragg grating in a rare-earth doped glass optical waveguide, the Bragg grating reflecting light at a target wavelength, said method comprising:
   a) generating ultrafast optical pulses having a writing wavelength in the range of 300 nm to 700 nm and an intensity sufficient to induce a change of refractive index in the rare-earth doped glass waveguide through material densification;
   b) diffracting the optical pulses using a phase mask to generate an interference pattern having a pitch providing a fundamental Bragg resonance corresponding to said target wavelength;
   c) impinging the interference pattern on a region of the rare-earth doped glass waveguide to write the same therein and define said Bragg grating; and
   d) heating the region of the waveguide containing the Bragg grating to a temperature above a threshold of about 350° C. for a predetermined heating period sufficient to substantially eliminate photodarkening effects in said waveguide.

2. The method according to claim 1, wherein the ultrafast optical pulses generated at step a) have a pulse duration of up to 2 picoseconds.

3. The method according to claim 1, wherein the generating of ultrafast optical pulses of step a) comprises:
   generating ultrafast seed optical pulses using a seed laser having a seed wavelength;
   converting said seed wavelength to the writing wavelength using a second harmonic generator.

4. The method according to claim 3, wherein said seed laser is a Ti-Sapphire laser and the seed wavelength is about 800 nm.

5. The method according to claim 4, wherein the pitch of the phase mask is about 738 nm.

6. The method according to claim 1, wherein the impinging of step c) comprises focussing the ultrafast optical pulses on said region of the optical waveguide using a cylindrical lens disposed ahead of said phase mask.

7. The method according to claim 1, further comprising a step of fine tuning the target wavelength of said Bragg grating, said fine tuning comprising adjusting a distance between the phase mask and the optical waveguide.

8. The method according to claim 1, wherein the heating of step d) comprises putting the rare-earth doped optical waveguide in an oven.

9. The method according to claim 8, wherein the heating of step d) comprises ramping a temperature of said oven from an initial value to a final value above said threshold.

10. The method according to claim 1, wherein the waveguide is an optical fiber having a core and at least one cladding.

11. The method according to claim 10, wherein the impinging of step c) is performed through the at least one cladding.

12. The method according to claim 10, further comprising a preliminary step of removing said cladding from a portion of said waveguide, the impinging of step c) being performed on said portion.

* * * * *